Figure 1:
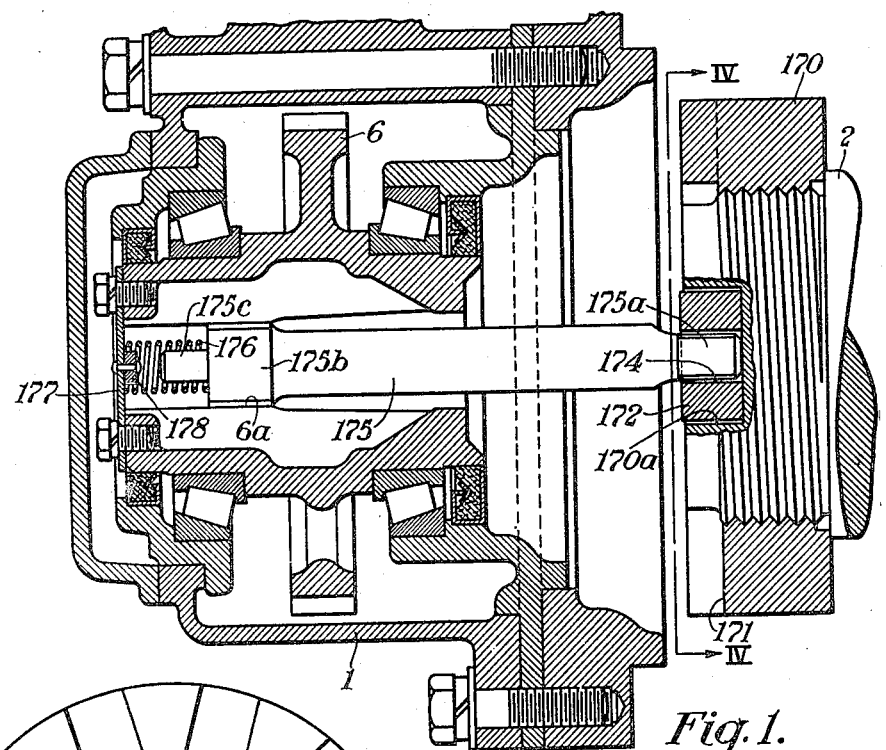

June 17, 1941.  H. L. BONE ET AL  2,245,897
DRIVE MECHANISM FOR AXLE DRIVEN SPEED RESPONSIVE
DEVICES FOR RAILWAY TRAINS
Original Filed April 30, 1938

INVENTORS
Herbert L. Bone and
John W. Livingston
BY
THEIR ATTORNEY

Patented June 17, 1941

2,245,897

UNITED STATES PATENT OFFICE 2,245,897

DRIVE MECHANISM FOR AXLE DRIVEN SPEED RESPONSIVE DEVICES FOR RAILWAY TRAINS

Herbert L. Bone and John W. Livingston, Forest Hills, Pa., assignors to The Union Switch & Signal Company, Swissvale, Pa., a corporation of Pennsylvania Application December 27, 1939, Serial No. 311,214, which is a division of Serial No. 205,276, April 30, 1938. Divided and this application September 7, 1940, Serial No. 355,782

4 Claims. (Cl. 74—12)

Our invention relates to drive mechanisms for axle driven speed responsive devices for railway trains.

One object of our invention is to provide a drive mechanism which will enable the speed responsive device to be mounted adjacent to, and driven from, the end of an axle of a modern light weight high speed train.

Another object of our invention is to provide a drive mechanism including a drive shaft which can be inserted or removed to connect the speed responsive device with or disconnect it from the associated axle without the necessity for removing the speed responsive device as a whole from the train.

According to our invention a rectangular opening having its center coaxial with the vehicle axle is provided in a lock key which is bolted to the end of the axle, and which extends at one end into one of a plurality of slots provided in a nut forming part of the roller bearing assembly to lock the nut in place on the axle. This rectangular opening receives with some clearance a rectangular extension formed on one end of a drive shaft. The other end of this drive shaft extends with clearance into the hub of the driving gear of the speed responsive device and is provided with a rectangular portion the opposite sides of which are slidably mounted in slots formed in the opposite sides of the hub of the driving gear. This other end of the shaft is also provided with a circular portion which cooperates with a coil spring held in place in the outer end of the gear by a plate bolted to the gear. Sufficient clearance is provided between the parts to allow for a limited amount of misalignment of the axis of the driving gear with the axle without binding the drive shaft, and the spring permits sufficient longitudinal movement of the drive shaft to take care of the normal longitudinal movements of the axle without interfering with the driving connection between the axle and the driving gear.

Other objects and characteristic features of our invention will appear as the description proceeds.

The present application is a division of our co-pending application for Letters Patent of the United States, Serial No. 311,214, filed on December 27, 1939, for Drive mechanisms for axle driven speed responsive devices for railway trains, which latter application is a division of our earlier filed application, Serial No. 205,276, filed on April 30, 1938, for Speed responsive devices, now Patent No. 2,211,554, granted August 13, 1940.

We shall describe one form of drive mechanism embodying our invention, and shall then point out the novel features thereof in claims.

Figure 2:
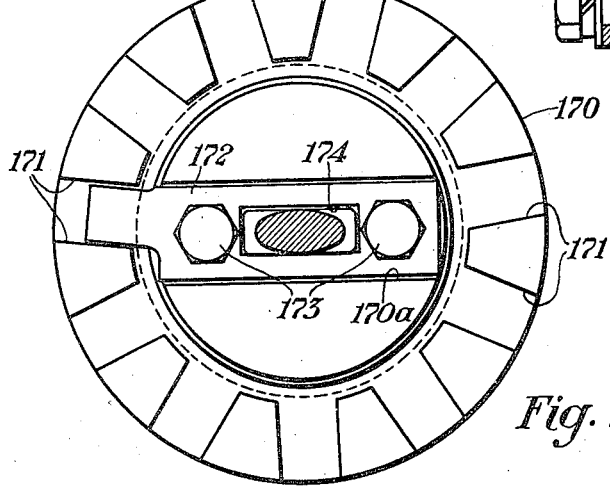
Figure 3:
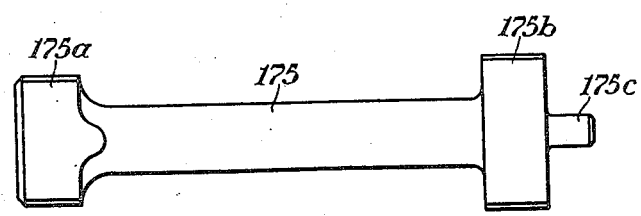

In the accompanying drawing, Fig. 1 is a longitudinal sectional view showing one form of drive mechanism embodying our invention for connecting a speed responsive device with a vehicle axle. Fig. 2 is a sectional view taken substantially on the line II—II of Fig. 1. Fig. 3 is a top plan view of the drive shaft 175 turned end for end from the position it occupies in Fig. 1.

Similar reference characters refer to similar parts in each of the several views.

Referring to the drawing, the reference character 1 designates a housing which is adapted to be secured in any suitable manner not shown to the journal box of railway vehicle adjacent one end of one of the axles 2 of the vehicle. This housing may contain any desired mechanism which it is desired to operatively connect with the axle 2, such for example, as a speed responsive device of the type shown and described in our prior application referred to hereinbefore, and as here illustrated this housing contains a gear 6 journaled in roller bearings 5 and disposed in axial alignment with the axle 2. It will be understood that this gear 6 forms a part of the driving mechanism for the speed responsive device, and according to our present invention we provide a flexible coupling which we shall now describe for connecting this gear with the axle 2.

This flexible coupling is designed primarily for use when the bearings in which the axle 2 is mounted are roller bearings, in which event the amount that the axle 2 will shift vertically, due to bearing wear, from the position in which it axis aligns with the axis of the gear 6 will be relatively small. As here illustrated, the axle 2 is threaded at its outer end to receive a nut 170 which serves to secure in place the inner race (not shown) of the roller bearing in which the axle 2 is mounted. The outer face of the nut 170 is provided with a plurality of slots 171, and extending into one of these slots is one end of a lock key 172 which is fastened to the end of the axle within a slot 170a by means of tap bolts 173 screwed into the axle. The lock key is pierced by a rectangular slot 174, the center of which is disposed at the center of the axle, and projecting into one end of this slot with some clearance is a rectangular extension 175a formed on one end of a drive shaft 175. The other end of the drive shaft extends with considerable clearance into the opening in the hub of the gear 6 and is provided with a rectangular portion 175b, the opposite ends of which are slidably mounted in slots 6a formed in the hub of the gear 6.

The inner end of the shaft is also provided with a circular portion 175c which receives one end of a compressed spring 176. The other end of the compressed spring 176 abuts against a plate 177 bolted to the hub of the gear 6 and is maintained in position by a spring guide 178 riveted to the plate 177. The parts are so proportioned that when the axis of the axle 2 is in alignment with the axis of the gear 6, the axis of the drive shaft will coincide with both the axis of the axle and the axis of the gear wheel, but that the clearance which is provided between the extension of the drive shaft and the associated slot in the lock key 172, and between the rectangular portion 175b and the slots 6a, is sufficient to permit a limited amount of axial misalignment between the drive shaft and the axle without producing any strain on the governor or in any way interfering with its proper operation. The parts are further so proportioned that the spring 176 will hold the drive shaft in operative engagement with the lock bar but will permit the shaft to move longitudinally with respect to the gear wheel the maximum amount the axle is permitted to move longitudinally by the roller bearings, and will also allow for some manufacturing variations. The parts are still further so proportioned that the drive shaft 175 can be readily removed and replaced while the governor is in place on the vehicle by merely removing the plate 177 and the associated cover of the casing 1.

One advantage of the coupling shown in the drawing is that by first removing the drive shaft and then inserting suitable drive mechanism into the outer end of the hub of the gear 6 the governor can be tested without the necessity for removing it from the vehicle.

Another advantage of the coupling shown in the drawing is that it facilitates mounting the governor on the vehicle since the drive shaft need not be inserted until after the governor is in place.

Although we have herein shown and described only one form of drive mechanism embodying our invention, it is understood that various changes and modifications may be made therein within the scope of the appended claims without departing from the spirit and scope of our invention.

Having thus described our invention, what we claim is:

1. In combination with a vehicle axle having a nut screwed onto one end of the axle and having a lock key secured to the end of the axle and cooperating with the nut to lock it in an adjusted position, a rotatable member journaled on the vehicle adjacent one end of said axle in axial alignment with the axle, a drive shaft disposed coaxially with said member and said axle and having one end operatively connected with said key within an opening formed therein by means which permits a limited amount of axial misalignment between said shaft and said axle and having the other end extending into an opening formed in said member and operatively connected therewith by means which permits a limited amount of axial misalignment between said shaft and said axle and a limited amount of longitudinal movement of said shaft relative to said member.

2. In combination with a vehicle axle, a member secured to one end of said axle and provided with a rectangular opening having its center coaxial with said axle, a gear journaled on the vehicle adjacent one end of said axle in axial alignment with the axle and provided with a hub having diametrically opposite longitudinally extending slots formed therein, a drive shaft disposed coaxially with said gear and said axle and having a rectangular extension on one end which extends with clearance into the opening in said member and provided at the other end with a rectangular portion which is slidably mounted in said slots.

3. In combination with a vehicle axle, a member secured to one end of said axle and provided with a rectangular opening having its center coaxial with said axle, a gear journaled on the vehicle adjacent one end of said axle in axial alignment with the axle and provided with a hub having diametrically opposite longitudinally extending slots formed therein, a drive shaft disposed coaxially with said gear and said axle and having a rectangular extension on one end which extends with clearance into the opening in said member and provided at the other end with a rectangular portion which is slidably mounted in said slots, and spring means for biasing said drive shaft to a position in which said extension is maintained in operative engagement with the opening in said member.

4. In combination with a vehicle axle, a member secured to one end of said axle and provided with a rectangular opening having its center coaxial with said axle, a gear journaled on the vehicle adjacent one end of said axle in axial alignment with the axle and provided with a hub having diametrically opposite longitudinally extending slots formed therein, a drive shaft disposed coaxially with said gear and said axle and having a rectangular extension on one end which extends with clearance into the opening in said member and provided at the other end with a rectangular portion which is slidably mounted in said slots, a plate secured to the outer end of said gear, and a compressed coil spring interposed between said plate and the adjacent end of said shaft.

HERBERT L. BONE.
JOHN W. LIVINGSTON.